United States Patent [19]

Shamp et al.

[11] Patent Number: 5,417,732
[45] Date of Patent: May 23, 1995

[54] OXYGEN FIRED GLASS FURNACE WITH BURNERS IN THE UPSTREAM END

[75] Inventors: Donald E. Shamp, Millbury, Ohio; Thomas F. Stark, Littleton, Colo.; Jack R. Elliott, Etowah; Larry E. Howard, Athens, both of Tenn.

[73] Assignee: Schuller International, Inc., Denver, Colo.

[21] Appl. No.: 166,651

[22] Filed: Dec. 13, 1993

Related U.S. Application Data

[63] Continuation of Ser. No. 944,552, Sep. 14, 1992, abandoned.

[51] Int. Cl.$^6$ .............................. C03B 5/16; C03B 5/20
[52] U.S. Cl. ........................................ 65/335; 65/347; 65/134.4; 65/135.1; 432/195
[58] Field of Search ................. 65/335, 347, 135, 136, 65/134.1, 134.4, 135.1, 135.9; 432/19, 20, 195, 196

[56] References Cited

U.S. PATENT DOCUMENTS

| | | | |
|---|---|---|---|
| 3,208,841 | 9/1965 | Burch | 65/335 |
| 3,248,205 | 4/1966 | Dolf et al. | 65/335 |
| 3,265,485 | 8/1966 | Carney et al. | 65/335 |
| 3,592,622 | 7/1971 | Shepherd | 65/335 |
| 3,897,232 | 7/1975 | Groves | 65/335 |
| 3,926,606 | 12/1975 | Charlesworth | 65/335 |
| 4,001,001 | 1/1977 | Knavish et al. | 65/347 |
| 4,028,083 | 6/1977 | Patznick et al. | 65/162 |
| 4,047,920 | 9/1977 | Armstrong | 65/335 |
| 4,082,528 | 4/1978 | Lythgoe et al. | 65/347 |
| 4,539,035 | 9/1985 | Burckhardt et al. | 65/335 |
| 5,006,141 | 4/1991 | Chen et al. | 65/134 |
| 5,057,133 | 10/1991 | Chen et al. | 65/27 |
| 5,139,558 | 8/1992 | Lauwers | 65/347 |

OTHER PUBLICATIONS

Brown, J., "100% Oxygen-Fuel Combustion for Glass Furnaces," Proceedings of the 51st Conference on Glass Problems, Nov. 1990.

Shamp et al, "Application of 100% Oxygen Firing at Parkersburg, West Virginia", Proceedings of the 51st Conference on Glass Problems, Nov. 1990.

Kabayashi et al, "No$_x$ Emissions from Oxy-Fuel Fired Glass Melting Furnaces" The Seventh Annual Glass Technology Seminar Proceedings, Sep. 1992, pp. 1–16.

Moore et al, "Conversion of a Large Container Furnace from Regenerative Firing to Direct Oxy-Fuel Combustion," Proceedings of the 52nd Conference on Glass Problems, Nov. 1991, pp. 18–24.

McMahon, A., "Corning's 100% Oxy-Fuel Combustion Technology: A Synopsis of 40 Furnace Conversions", The Seventh Annual Glass Technology Seminar Proceedings, Sep. 1992.

Iatrides et al, "French All-Oxygen Conversion Trials", Glass International, Mar. 1993, pp. 5–6.

Tuson, G et al "How 100% Oxygen Firing Impacts Regenerative Melters", Glass Industry, Mar. 1992, pp. 12–14, 17–20, 25, 26.

Mitchell, M. D. "Manville Plant Gets a Boost from Oxygen-Gas Firing", Glass Industry, Jan. 1992, pp. 10–14.

*Primary Examiner*—W. Gary Jones
*Assistant Examiner*—Steven P. Griffin
*Attorney, Agent, or Firm*—Cornelius P. Quinn

[57] ABSTRACT

A furnace for melting and refining E glass comprises a melting and refining tank for melting and refining the glass batch materials into glass and a forehearth, downstream of the tank, for further refining the glass and delivering the glass to fiberizing means. The melting and refining tank is heated with oxygen fired burners. The oxygen fired burners in the melting and refining tank are located in the sidewalls at the upstream end of the tank and extend for about one-third the length of the tank. In one embodiment, burners are also located in the upstream end wall. This arrangement of the oxygen fired burners at the upstream end of the melting and refining tank moves the melter hot spot upstream for better refining of the glass and enables the furnace to produce a higher output of glass than can be obtained in a conventional E glass furnace of the same size.

7 Claims, 2 Drawing Sheets

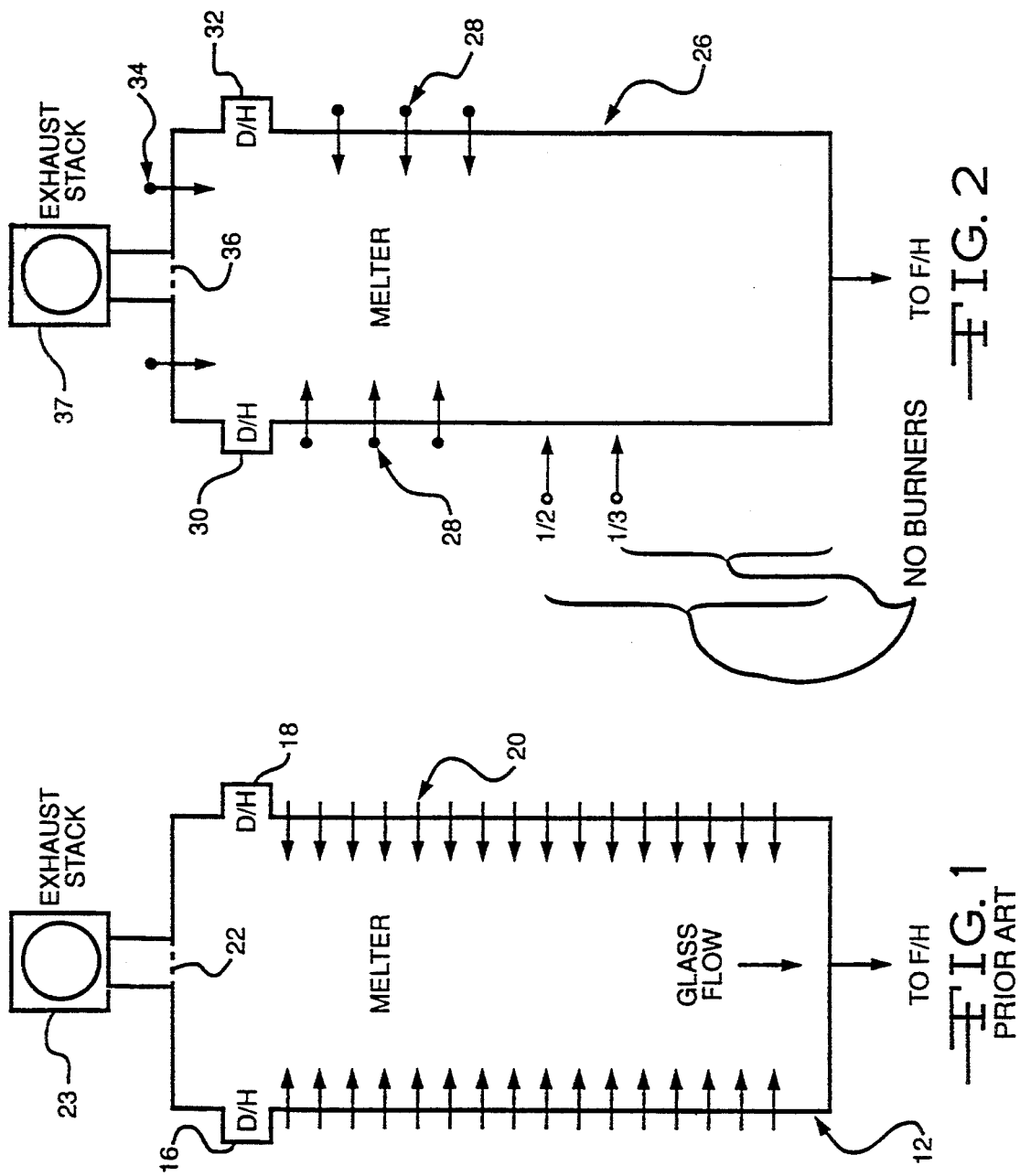

OXYGEN FIRED GLASS FURNACE WITH BURNERS IN THE UPSTREAM END

This is a continuation of application Ser. No. 07/944,552, filed Sep. 14, 1992, now abandoned, entitled METHOD AND APPARATUS FOR MELTING AND REFINING GLASS IN A FURNACE USING OXYGEN FIRING.

FIELD OF THE INVENTION

This invention relates to an apparatus and method for producing glass filaments and other glass products by melting and refining glass in a furnace that uses oxygen fired burners in the upstream end of the melting and refining tank.

BACKGROUND OF THE INVENTION

In the manufacture of glass, such as E glass fibers or filaments, by a continuous melting process, glass batch material is delivered to a furnace at the upstream end of the melting and refining tank. The glass batch material is melted and refined as it passes through the melting and refining tank to a forehearth which is connected to the downstream end of the melting and refining tank. The glass is withdrawn from the melting and refining tank into a conditioning section of the forehearth from which the glass passes to the working forehearth where the glass is distributed to fiber forming equipment and withdrawn from the forehearth through the fiber forming equipment to form the fibers or filaments.

In conventional E glass furnaces of the type shown in FIG. 1, the glass batch materials are melted by directly opposed air/gas fired burners which extend for substantially the entire length of the melting and refining tank. The forehearth is also fired with directly opposed air/gas burners to further refine the glass and to regulate and maintain the glass at the desired temperature for the fiber or filament forming process.

In a typical combustion process using an air/gas fired burner, natural gas and air is usually combined in a set ratio of 10 parts air to 1 part natural gas by volume. The main drawback to this method of combustion is the nitrogen content of air which constitutes 78% of air by volume and contributes nothing to the combustion process. Thus with air/gas fired burners, large volumes of air are required relative to the volume of natural gas consumed. The relatively large volumes of combustion air and the resulting large volumes of exhaust gases which must be processed using air/gas fired burners require the use of costly, high volume combustion air and exhaust gas systems.

For more efficient combustion, the air supplied to the air/gas fired burners should be preheated from ambient temperatures to temperatures of about 1200 degrees Fahrenheit. Since the volume of air to natural gas employed by the burners is approximately 10 to 1, relatively large volumes of air must be heated to these high temperatures and delivered to the burners for use in the process. This requires the use of high temperature metal recuperators to preheat the combustion air and high temperature metal piping and insulation to deliver the hot air to the burners. These recuperators are expensive to construct and, with the highly corrosive exhaust gases that pass through them, costly to maintain.

In addition to greatly increasing the volume of gases to be preheated and handled in the combustion system, the presence of nitrogen in the air detracts from the heating process by carrying part of the heat of combustion away from the process. Thus, part of the heat of combustion goes to the nitrogen rather than to the glass melt for which it is intended and contributes nothing to the process. The presence of nitrogen in the combustion process also leads to the formation of nitrogen oxide emissions.

The low efficiencies of the air/gas fired burners require the use of a large number of burners along substantially the entire length of the melting and refining tank in order to melt and refine the glass batch materials. The furnace illustrated in FIG. 1 uses a total of thirty-two air/gas fired burners in the melting and refining tank.

BRIEF DESCRIPTION OF THE INVENTION

The melting and refining system of the present invention solves many of the problems associated with the air/gas fired E glass furnaces of the prior art. The use of commercially available oxygen/gas fired burners located in the melting and refining tank adjacent the upstream end of the tank in accordance with the present invention can reduce the number of burners required in the melting and refining tank by as much as 75%. This result was not expected by those experienced in the refining of glass in E glass unit melters and on the first furnace installation more oxygen/gas fired burners were installed than were required. It was only after the furnace had been placed in operation that it was determined that the burners located closest to the forehearth or downstream end of the melting and refining tank were not needed. This reduction in the number of burners and related equipment required to heat the furnace simplifies the control system for the furnace while improving the process.

The air/gas fired burners use 10 parts air to 1 part natural gas by volume. The oxygen/gas fired burners use 2 parts oxygen to 1 part natural gas by volume. By greatly reducing the volumes of the products of combustion, there is no longer a need for the costly combustion air systems used with the air/gas fired burners in the E glass furnaces of the prior art. In addition, costly recuperators along with the associated piping, control and monitoring systems can be eliminated and the maintenance time and expense associated with the use of these systems in a highly corrosive atmosphere can be eliminated too.

The oxygen/gas fired burners have a more luminous flame than the flame of the air/gas fired burners. This results in better heat transfer to the glass batch materials and a reduction in the natural gas usage for the furnace of about one-third due to the better heat transfer and the elimination of the need to heat up the large volumes of nitrogen found in the air used in the air/gas fired burners.

With the oxygen/gas fired burners located adjacent the upstream end of the melting and refining tank where the glass batch materials are introduced into the furnace and with the better heat transfer from the flames of the oxygen/gas fired burners to the glass batch materials, the glass batch materials melt faster moving the melting and refining tank hot spot closer to the upstream end of the melting and refining tank. Approximately one third, preferably one half, and most preferably two thirds of each of the sidewalls of the melting and refining tank, adjacent the downstream end of the tank, has no burners. This has the effect of increasing the volume of the bath within the tank that is available for refining the glass and increases the capacity of the furnace over an air/gas fired furnace of the same size.

By reducing the products of combustion from 11 parts to 3 parts, and eliminating the nitrogen present in air/gas combustion, emissions are greatly reduced with less particulate carryover going out of the melting and refining tank. Corrosive volatiles which later condense and cause maintenance problems are also reduced.

With less exhaust emissions being produced by the furnace, the back wall exhaust port of the melting and refining tank can be reduced in size. This permits the movement of the doghouses from the sidewalls of the melting and refining tank to the upstream wall or back wall of the melting and refining tank. This too has the effect of increasing the melting and refining portion of the melting and refining tank and contributes to increasing the capacity of the furnace.

As discussed in the article, MANVILLE PLANT GETS A BOOST FROM OXYGEN-GAS FIRING, pp. 10–14, GLASS INDUSTRY, January 1992, oxygen-gas firing has been used in glass furnaces for lower temperature melting of glass to produce insulation fiber. Oxygen/gas firing has also been used in regenerative melters for making glass bottles as discussed in the article, HOW 100% OXYGEN FIRING IMPACTS REGENERATIVE MELTERS, pp. 12–14, 17–20, 25 and 26, GLASS INDUSTRY, March 1992.

However, to Applicants' knowledge, the subject invention is the first time oxygen/gas firing has been used in an E glass furnace with its relatively high temperature operating conditions. High temperature glasses, such as E glass, are glasses containing less than 3% alkali oxide and usually less than 1½% alkali oxide. For proper melting and refining, these glasses require furnace temperatures in excess of 2750 degrees Fahrenheit and usually above 2850 degrees Fahrenheit. Since these temperatures are very near the maximum safe operating temperatures for the furnace lining refractories, there was a concern that oxygen/gas fired burners, with hotter flame temperatures than the air/gas fired burners, would overheat the furnace lining in places damaging the refractories. After the furnace was placed in operation, it was determined that the overheating did not occur.

In addition to the above, the unique placement of the oxygen/gas fired burners at the upstream end of the furnace was found to enhance the melting and refining capabilities of the furnace. This unique placement of the oxygen/gas fired burners is not disclosed in the above mentioned articles.

BRIEF DESCRIPTION OF THE DRAWINGS

FIG. 1 is a plan schematic view of a typical air/gas fired melting and refining tank of the prior art.

FIG. 2 is a plan schematic view of a first embodiment of the oxygen/gas fired melting and refining tank of the present invention.

DETAILED DESCRIPTION OF THE INVENTION

Figure 4:
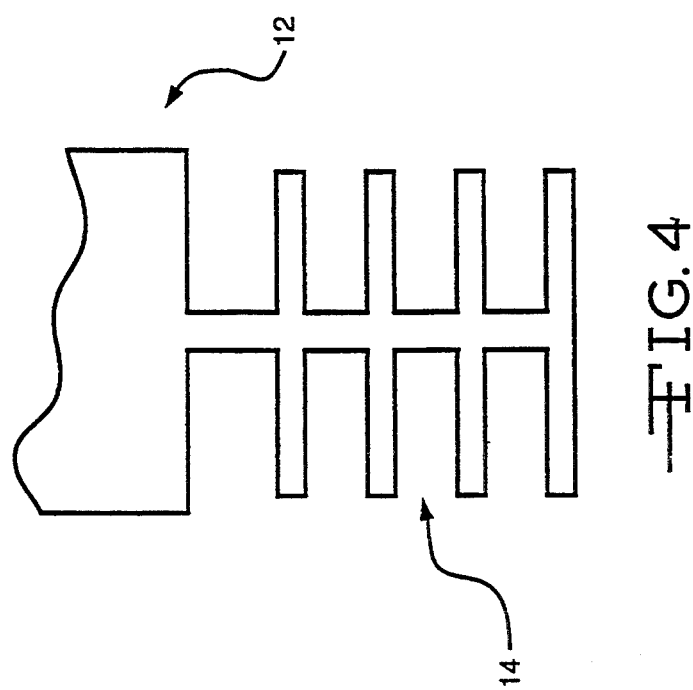
FIG. 4 is a plan schematic view of a forehearth.

FIG. 1 illustrates a typical prior art air/gas fired melting and refining tank 12 which is used in the manufacture of E glass fibers or continuous glass filaments. The melting and refining tank 12 can vary in size but is typically 40 to 50 feet long by about 20 feet wide and is made of refractory materials to withstand the high temperatures required to melt and refine E glass batch materials into E glass. The downstream end of the melting and refining tank 12 is directly connected to a forehearth, such as forehearth 14 of FIG. 4, and the glass flows from the melting and refining tank 12 into the forehearth where the glass is further refined and distributed to the fiberizers of the fiber or continuous filament forming process.

As shown in FIG. 1, the E glass batch materials are fed into the melting and refining tank 12 through doghouses 16 and 18 which are located on either side of the melting and refining tank adjacent the upstream end of the melting and refining tank 12. After the glass batch materials are introduced into the melting and refining tank 12, the glass batch materials are melted and refined as they pass through the melting and refining tank to the forehearth 14. The glass batch materials are heated, melted and refined by air/gas burners 20 which extend for substantially the entire length of the melting and refining tank from the doghouses 16 and 18 to the downstream end of the melting and refining tank where the glass flows into the forehearth 14. In the furnace shown, each sidewall of the melting and refining tank 12 is provided with sixteen air/gas fired burners 20 spaced from each other on twenty-one inch centers and directly opposite the burners 20 on the opposing sidewall. With the large number of air/gas fired burners 20 required to melt and refine the glass batch materials, costly combustion air preheating and exhaust gas recuperator systems are required in a manufacturing process using air/gas fired burners. A large exhaust port 22 and exhaust stack 23 is provided at the upstream end of the melting and refining tank 12 to accommodate the large volumes of exhaust gases produced by the process.

FIG. 2 illustrates a first embodiment of the present invention with an E glass melting and refining tank 26 that has the same dimensions as the melting and refining tank 12 of the prior art. The melting and refining tank 26 uses conventional oxygen/gas fired burners 28 such as MaxCor, OXY-THERM burners or Combustion Tec, Inc., CLEANFIRE burners. As shown, there are three oxygen/gas fired burners 28 in each sidewall of the melting and refining tank downstream of the doghouses 30 and 32 and two oxygen/gas fired burners 34 in the back wall or upstream wall of the melting and refining tank 26 on either side of the exhaust port 36 which leads to exhaust stack 37. The oxygen/gas fired burners 28 are located fourteen inches plus or minus four inches above the surface of the glass melt and are spaced apart a distance about twice that of the air/gas fired burners 20 of the prior art E glass melting and refining tank with the oxygen/gas fired burners being spaced about forty-two inches apart.

The oxygen/gas fired burners 28 have a much higher BTU output per burner than the air/gas fired burners 20 and in accordance with the present invention the burners on one sidewall are offset with respect to the burners 28 in the other sidewall to effect a better heat distribution in the upstream portion of the melting and refining tank 26. This arrangement of the oxygen/gas fired burners in the sidewalls plus the placement of the two burners 34 in the upstream end wall moves the hot spot closer to the upstream end of the melting and refining tank. This has the effect of increasing the melting and refining area of the furnace without increasing the size of the melting and refining tank 26. Thus, the capacity of the melting and refining tank is increased.

By reducing the number of burners in the melting and refining tank 26 by as much as 75%, the burner control system is greatly simplified. In addition, the reduction in the number of burners and the use of oxygen greatly reduces the volumes of gases used in the process and eliminates the need to preheat the combustion air as was required in the prior art process. Thus, the present invention eliminates the need for combustion air preheating systems, recuperators and the associated piping, control and monitoring systems while increasing the capacity of the melting and refining tank 26. As in the prior art E glass furnace, the glass flows from the melting and refining tank 26 into the forehearth 14 where the glass is further refined and distributed to the fiberizing stations.

Figure 3:
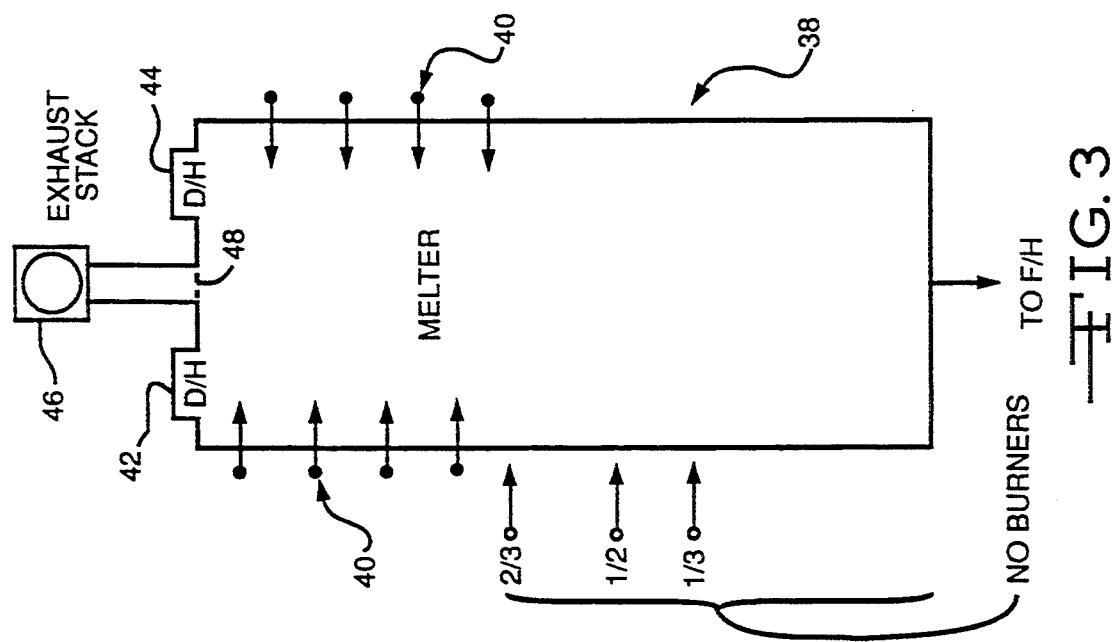
FIG. 3 is a plan schematic view of a second embodiment of the oxygen/gas fired melting and refining tank the present invention.

FIG. 3 illustrates a second embodiment of the present invention with an E glass melting and refining tank 38 which has the same dimensions as the melting and refining tank 12 of the prior art. In this embodiment all eight of the oxygen/gas fired burners 40 are positioned in the sidewalls of the melting and refining tank adjacent the upstream end of the melting and refining tank 38. The oxygen/gas fired burners 40 in one sidewall are offset from the burners in the opposite sidewall and spaced from each other in the same manner as the burners 28 of the first embodiment of the present invention. The burners are conventional oxygen/gas fired burners, such as, MaxCor, OXY-THERM burners or Combustion Tec, Inc., CLEANFIRE burners.

As shown in FIG. 3, the doghouses 42 and 44 are both located in the upstream wall or back wall of the melting and refining tank 38. This allows the burners in the sidewalls to be located adjacent the back or upstream wall of the melting and refining tank 38.

Another method of introducing the E glass batch materials into the melting and refining tank 38 is through the use of several batch chargers located in the back or upstream wall of the tank. While the use of several batch chargers in the upstream wall of regenerative furnaces is known, batch chargers have not been used on unit melters because of the large exhaust gas chamber and recuperator stack support normally located adjacent the exterior of the upstream wall of air/gas fired unit melters. The use of batch chargers eliminates the use of the doghouses and the exhaust gases are removed from the tank 38 and directed to the exhaust stack 46 through one or more openings in the back wall above the batch chargers such as through the exhaust port 48. As with the use of the doghouses 42 and 44, the use of the batch chargers allows the burners to be located adjacent the back or upstream wall of the tank 38.

As with the first embodiment illustrated in FIG. 2, this arrangement of the oxygen/gas fired burners 40 and the doghouses 42 and 44 moves the hot spot of the melting and refining tank upstream and increases the capacity of the melting and refining tank. The other advantages discussed above are also realized.

While, for the purposes of illustration, the process has been described using oxygen/natural gas fired burners, it is to be understood that propane or oil fired burners can be substituted for the natural gas fired burners when these fuels are desired.

The present invention has proved to be very beneficial in the production of glass filaments where highly refined homogeneous glass is required to produce a good product. However, it is contemplated that this process can be used to produce other glass products too.

What is claimed is:

1. A furnace for melting and refining glass comprising:

a tank for melting and refining the glass, said tank having an upstream end wall, a downstream end and opposed sidewalls extending the length of said tank between the upstream end wall and the downstream end;

a forehearth downstream of and connected to the downstream end of said tank for further refining the glass and delivering the glass to product forming means;

glass batch feeder means at the upstream end of said tank for feeding glass batch materials into said tank;

burners located in each of the opposed sidewalls of said tank, all of said burners being oxygen fired burners and said burners being located in no more than approximately two-thirds of the length of said sidewalls, the portion of the sidewalls containing said burners being adjacent the upstream end wall of said tank, there being no burners in at least approximately one third of the length of the sidewalls adjacent the downstream end of said tank.

2. The furnace of claim 1 wherein:

said burners are located in no more than approximately one half the length of the sidewalls of said tank, the portion of the sidewalls containing said burners being adjacent the upstream end wall of said tank, there being no burners in at least approximately one half of the length of the sidewalls adjacent to the downstream end of said tank.

3. The furnace of claim 1 wherein:

said burners are located in no more than approximately one third the length of the sidewalls of said tank, the portion of the sidewalls containing said burners being adjacent the upstream end wall of said tank, there being no burners in approximately two thirds of the length of the sidewalls adjacent to the downstream end of the tank.

4. The furnace of any of claims 1-3 wherein:

each of said burners in one of said sidewalls is offset from each of said burners in the opposed sidewall.

5. The furnace of any of claim 1-3 wherein:

oxygen fired burner means are also located in said upstream end wall of said tank.

6. The furnace of any of claim 1-3 wherein:

said feeder means is located in said upstream end wall of said tank.

7. The furnace of any of claim 1-3 wherein:

the furnace is an E glass melting and refining furnace for making glass fiber.

* * * * *